US011351999B2

(12) United States Patent
Luu

(10) Patent No.: US 11,351,999 B2
(45) Date of Patent: Jun. 7, 2022

(54) TRAFFIC COLLISION WARNING DEVICE

(71) Applicant: Xuan Binh Luu, Vinh Phuc (VN)

(72) Inventor: Xuan Binh Luu, Vinh Phuc (VN)

(73) Assignee: Xuan Binh Luu, Vinh Phuc (VN)

( * ) Notice: Subject to any disclaimer, the term of this patent is extended or adjusted under 35 U.S.C. 154(b) by 0 days.

(21) Appl. No.: 17/475,427

(22) Filed: Sep. 15, 2021

(65) Prior Publication Data

US 2022/0080963 A1   Mar. 17, 2022

(51) Int. Cl.
| | |
|---|---|
| *B60W 30/00* | (2006.01) |
| *B60W 30/095* | (2012.01) |
| *B60W 40/10* | (2012.01) |
| *B60W 50/14* | (2020.01) |

(52) U.S. Cl.
CPC .... *B60W 30/0956* (2013.01); *B60W 30/0953* (2013.01); *B60W 40/10* (2013.01); *B60W 50/14* (2013.01); *B60W 2050/143* (2013.01)

(58) Field of Classification Search
None
See application file for complete search history.

(56) References Cited

U.S. PATENT DOCUMENTS

| | | | | |
|---|---|---|---|---|
| 5,170,162 A | * | 12/1992 | Fredericks | ............. G08G 1/056 342/69 |
| 5,617,086 A | * | 4/1997 | Klashinsky | .............. G08G 1/08 340/936 |
| 6,204,778 B1 | | 3/2001 | Bergan et al. | |
| 6,516,273 B1 | * | 2/2003 | Pierowicz | ........ G08G 1/096783 340/929 |
| 6,633,238 B2 | * | 10/2003 | Lemelson | ............ G08G 1/0116 340/905 |
| 6,750,787 B2 | | 6/2004 | Hutchinson | |
| 7,190,306 B2 | * | 3/2007 | Janssen | ................... G01S 13/92 342/134 |

(Continued)

FOREIGN PATENT DOCUMENTS

| | | |
|---|---|---|
| CN | 108944767 A | 12/2018 |
| EP | 1028404 A2 | 8/2000 |
| GB | 979471 A | 1/1965 |

*Primary Examiner* — Jonathan M Dager
(74) *Attorney, Agent, or Firm* — K&L Gates LLP

(57) ABSTRACT

The present invention relates to a traffic collision warning device comprising: a main circuit board (11); a central processing unit (12) being mounted on the main circuit board (11) and controlling the operation of the device; a memory (111); a warning signal generator (18); sensors (c1, c2, c3, c4, c1', c2', c3', c4') being arranged along the road near a collision-prone area; a vehicle identification module; timers (tm, tm'); vehicle counters (n, n'); and a movement direction comparison module. Wherein, the direction of movement of a vehicle is identified based on the order in which it passes through the sensors, the vehicle velocity is calculated by dividing the distance between the two sensors by the period of time it takes the vehicle to pass through the two sensors; the vehicle length is calculated by multiply the vehicle velocity and the period of time it takes the vehicle to pass through a sensor. When at least two vehicles moving from opposite directions are possibly to meet each other in the collision-prone area, the device emits collision warning signals at different levels depending on the velocities of the vehicles.

2 Claims, 6 Drawing Sheets

(56) References Cited

U.S. PATENT DOCUMENTS

| | | | |
|---|---|---|---|
| 7,317,406 B2* | 1/2008 | Wolterman | G08G 1/08 340/905 |
| 7,400,963 B2* | 7/2008 | Lee | B60W 10/184 701/72 |
| 7,688,222 B2* | 3/2010 | Peddie | G08G 1/096783 116/63 P |
| 8,340,894 B2* | 12/2012 | Yester | G08G 1/096791 701/301 |
| 8,489,354 B2* | 7/2013 | Onea | G08G 1/054 702/96 |
| 8,502,697 B2* | 8/2013 | Bushman | G08G 1/08 340/917 |
| 8,554,456 B2* | 10/2013 | Brant | G08G 1/083 701/117 |
| 8,618,952 B2* | 12/2013 | Mochizuki | G08G 1/096783 340/995.25 |
| 8,918,270 B2* | 12/2014 | Wang | G08G 1/0133 340/936 |
| 9,129,519 B2* | 9/2015 | Aoude | G08G 1/166 |
| 9,134,133 B2* | 9/2015 | Denaro | G06F 16/444 |
| 9,182,241 B2* | 11/2015 | Denaro | B60W 40/06 |
| 9,604,641 B2* | 3/2017 | Al-Stouhi | B60W 30/0953 |
| 9,953,526 B2* | 4/2018 | Arnold | G08G 1/04 |
| 10,011,277 B2* | 7/2018 | Meinhart | B60W 30/095 |
| 10,109,186 B2* | 10/2018 | Blekken | G08G 1/056 |
| 10,118,610 B2* | 11/2018 | Deng | B60W 30/0956 |
| 10,235,882 B1* | 3/2019 | Aoude | G08G 1/163 |
| 10,266,175 B2* | 4/2019 | Miller | B60W 30/18154 |
| 10,565,880 B2* | 2/2020 | Aoude | G06N 20/00 |
| 10,648,817 B2* | 5/2020 | Denaro | B60W 40/02 |
| 11,210,936 B2* | 12/2021 | Malkes | G08G 1/015 |
| 2007/0276600 A1* | 11/2007 | King | G08G 1/0962 340/436 |
| 2011/0298603 A1* | 12/2011 | King | G08G 1/042 340/436 |
| 2020/0111351 A1* | 4/2020 | Vadlamani | H04W 4/46 |
| 2020/0341117 A1* | 10/2020 | Sandford | G01S 17/93 |
| 2021/0107537 A1* | 4/2021 | Ross | B60W 30/09 |

* cited by examiner

\* t1 (the front wheels pass sensor c1)

t3-t1>0: The vehicle moves from left to right    (11)
t3-t1<0: The vehicle moves from right to left    (12)

The vehicle velocity:
$v = d_{12}/|t_3-t_1|$    (13)
The distance between the front wheels and the rear wheels:
$l = v \cdot |t_2-t_1|$    (14)

\* t2 (the rear wheels pass sensor c1)

\* t3 (the front wheels pass sensor c2)

\* t4 (the rear wheels pass sensor c2)

* t10 (the front of the vehicle pass sensor c1)

t30-t10>0: The vehicle moves from left to right (21)
t30-t10<0: The vehicle moves from right to left (22)

The vehicle velocity:
$v = d_{12}/|t_{30}-t_{10}|$     (23)
The vehicle length:
$m = v*|t_{20}-t_{10}|$     (24)

* t20 (the whole vehicle passes through sensor c1)

* t30 (the front of the vehicle pass sensor c2)

| On the left side of the collision-prone area | On the right side of the collision-prone area |
|---|---|
| The device sets initial values for:<br>- Vehicle counter: n;<br>- Delay time to keep variable CM in True value: t0; | The device sets initial values for:<br>- Vehicle counter: n';<br>- Delay time to keep variable CM' in True value: t0'; |
| When a vehicle passes through sensors $c_1$, $c_2$:<br>- The direction of movement is identified by formulas (11), (12) or (21), (22);<br>- The vehicle velocity is calculated by formula (13) or (23);<br>- The vehicle identity is identified by formula (14) or (24); | When a vehicle passes through sensors $c_1'$, $c_2'$:<br>- The direction of movement is identified by formulas (11), (12) or (21), (22);<br>- The vehicle velocity is calculated by formula (13) or (23);<br>- The vehicle identity is identified by formula (14) or (24); |
| If the vehicle direction is from left to right::<br>- CM=True<br>- Timer tm is reset, and then it value is incremented gradually;<br>- Vehicle counter n is incremented by one;<br>- Vehicle identification module is activated;<br>If the direction of movement of the vehicle is from right to left, sensors $c_1$, $c_2$ are kept in waiting mode | If the vehicle direction is from left to right::<br>- CM'=True<br>- Timer tm' is reset, and then it value is incremented gradually;<br>- Vehicle counter n' is incremented by one;<br>- Vehicle identification module is activated;<br>If the direction of movement of the vehicle is from right to left, sensors $c_1'$, $c_2'$ are kept in waiting mode |
| When the vehicle passes sensors $c_3$, $c_4$, the device identifies the direction of movement, the vehicle velocity, and the vehicle identity in the same way as when the vehicle passes sensors $c_1$, $c_2$ | When the vehicle passes sensors $c_3'$, $c_4'$, the device identifies the direction of movement, the vehicle velocity, and the vehicle identity in the same way as when the vehicle passes sensors $c_1'$, $c_2'$ |
| If the direction of movement and the vehicle identity are the same as when the vehicle passes sensors $c_1$, $c_2$; and timer value exceeds the delay time (tm > t0):<br>- CM=False<br>(Otherwise, CM is still True)<br>- Movement direction comparison module is activated | If the direction of movement and the vehicle identity are the same as when the vehicle passes sensors $c_1'$, $c_2'$; and timer value exceeds the delay time (tm' > t0'):<br>- CM'=False<br>(Otherwise, CM' is still True)<br>- Movement direction comparison module is activated |

The movement direction comparison module checks the values of CM and CM':
- If both CM and CM' are True, collision warning signals are emitted;
- If either CM or CM' is False, collision warning signals are terminated.

FIG.10

TRAFFIC COLLISION WARNING DEVICE

This application claims priority to Vietnamese Patent application No. 1-2020-05327 filed Sep. 16, 2020, which is incorporated by reference herein in its entirety.

BACKGROUND OF THE INVENTION

1. Field of the Invention

The present invention relates to a traffic collision warning device. The device according to the present invention identifies the movement directions of vehicles, the vehicle identities, and emits a traffic collision warning signal when the vehicles moving from opposite directions are prone to collisions at a collision-prone area.

2. Description of the Related Art

It is known some prior art solutions related to the measurement and recording of vehicle traffic. U.S. Pat. No. 6,750,787 B2 proposed a device to count vehicles moving on a road, identify the movement directions of the vehicles, and measure the velocities of the vehicles by using sensors and optical light beam emitting devices which are positioned spaced apart and emit the optical light beams across the road and above the road surface. Collected data is then recorded for the measurement of vehicle traffic. However, this device does not have a traffic collision warning function.

Chinese patent application publication No. CN108944767A disclosed collision warning device at a bend in using radar sensors. As shown in FIG. 1, two radar sensors 5 are located near the bend to identify vehicles, and warning signals are emitted when two vehicles are simultaneously moving to the bend. However, with that sensor arrangement, the device will emit a warning signal even if one of the two vehicle moves out of a collision-prone area as the case shown in FIG. 2. In this case, when the warning signal is emitted, the two vehicles have already been close to each other, so the warning signal would be either too late or unnecessary. In addition, this device seems to be unable to provide solutions for the case where many vehicles continuously enter or leave the collision-prone area.

BRIEF SUMMARY OF THE INVENTION

Derived from the above facts, one object of the present invention is to provide a device that can to identify the movement directions and the vehicle lengths, and emit collision warning signals at different levels. Another object of the present invention is to provide a device that can operate effectively even in the case many vehicles enter and leave the collision-prone area at the same time.

A collision-prone area is the area at the bend of a road or any other area or length of the road where the vision of drivers is obstructed or the vehicles have to change velocities or directions. Therefore, collision warning signals should be emitted before two vehicles coming from opposite directions meet in the collision-prone area, and no warning is needed when the vehicles have passed through this area.

To identify the risk of collision between two vehicles moving to the collision-prone area, it is necessary to identify a number of factors such as the directions, the velocities, and the locations of the vehicles.

In which, the direction of movement of a vehicle can be identified based on the order in which it passes through two sensors placed along the road. Specifically, if the vehicle passes through the left sensor first, the direction of movement of the vehicle is from the left to the right; if the vehicle passes the right sensor first, the direction of movement of the vehicle is from the right to the left.

Similarly, if the two sensors are located a certain distance apart, the vehicle velocity can be calculated based on the time it takes for the vehicle to pass through these sensors, specifically the vehicle speed can be calculated by dividing the distance between the two sensors by the time it takes the vehicle to pass the two sensors.

Positions of vehicles are an important factor in determining warning signals. A pre-collision area is an area or a length of the road located at a certain distance away from the collision-prone area. In case two vehicles moving to the collision-prone area from opposite directions, the risk of a collision in the collision-prone area is high when at the same time the vehicle from the left is moving through the pre-collision area on the left side of the collision-prone area and the vehicle from the right is moving through the pre-collision area on the right side of the collision-prone area.

To identify whether a vehicle is moving through the pre-collision area or not, two pairs of sensors are used, in which the first pair of sensors is located at the beginning of the pre-collision area, and the second pair of sensors is located at the end of the pre-collision area. When the vehicle passes through the first pair of sensors, the vehicle length is calculated by multiplying the vehicle velocity and the time it takes for the vehicle to pass through either sensor. When the vehicle passes through the second pair of sensors, the vehicle length is calculated in the same way. If the vehicle length identified by the second pair of sensors matches the vehicle length identified by the first pair of sensors, the device identifies that the vehicle is moving to the collision-prone area. In the description below, the identification results are represented by variables CM and CM' as follows:

CM=True: a vehicle is moving through the pre-collision area on the left side of the collision-prone area;

CM=False: no vehicles are moving through the pre-collision area on the left side of the collision-prone area;

CM'=True: a vehicle is moving through the pre-collision area on the right side of the collision-prone area;

CM'=False: no vehicles are moving through the pre-collision area on the right side of the collision-prone area.

It is noted that the use of the variables CM and CM' is only to facilitate the description of the present invention. In practice, it is possible to use other variables or not use any variables. It is important that the device identifies that two vehicles moving from opposite directions possibly meet each other in the collision-prone area in order to emit collision warning signals.

In the case multiple vehicles enter and exit the collision-prone area consecutively within a short period of time, the risk of a collision remains until the last one of these vehicles has left the collision-prone area. Therefore, it is preferred to keep emitting warning signals until the last vehicle has left of the collision-prone area rather than turning off the warning signal each time when a vehicle exits the collision-prone area. To deal with this issue, after determining the presence of a vehicle in the pre-collision area, the device keeps the values of CM=True and CM'=True for a certain period of time t0. The duration t0 can be identified based on the length of the pre-collision area, the permissible vehicle velocity, or any other factors at the installation site of the device. In this way, a vehicle moving out of the pre-collision area will not cause the warning signals terminated when other vehicles are still moving through the pre-collision area.

In a preferred embodiment, the present invention provides a traffic collision warning device comprising:

a main circuit board; a central processing unit being mounted on the main circuit board for controlling the operation of the device; a memory; a warning signal generator;

a first sensor and a second sensor being arranged on the left side of a collision-prone area;

a third sensor and a fourth sensor being arranged near the collision-prone area;

a fifth sensor and a sixth sensor being arranged on the right side of the collision-prone area;

a seventh sensor and an eighth sensor being arranged near the collision-prone area;

a vehicle identification module;

timers;

a movement direction comparison module;

wherein, the direction of movement of a vehicle is identified based on the order in which it passes through the sensors, specifically if the vehicle passes through the sensor on the left first, the direction of movement of the vehicle is from the left to the right, if the vehicle passes through the sensor on the right first, the direction of movement of the vehicle is from the right to the left;

the vehicle velocity is calculated by dividing the distance between two sensors by the period of time it takes the vehicle to pass through the two sensors;

the vehicle identity is identified by multiply the vehicle velocity and the period of time it takes the vehicle to pass through a sensor;

firstly, the device sets initial values for vehicle counters, delay time to keep variable CM in True value, and delay time to keep variable CM' in True value;

on the left side of the collision-prone area, when a vehicle passes the first sensor and the second sensor, the device identifies the direction of movement, the vehicle velocity, and the vehicle identity;

if the vehicle direction is from the left to the right, CM is set as True; timer is reset, and then its value is incremented gradually; the vehicle counter is incremented by one; and the vehicle identification module is activated;

when the vehicle passes the third sensor and the fourth sensor, the device identifies the direction of movement, the vehicle velocity, and the vehicle identity; if the direction of movement and the vehicle identity are the same as when the vehicle passes the first sensor and the second sensor, then the movement direction comparison module is activated; if the timer value exceeds the delay time, CM value is set as False and then the movement direction comparison module is activated;

on the right side of the collision-prone area, when a vehicle passes the fifth sensor and the sixth sensor, the device identifies the direction of movement, the vehicle velocity, and the vehicle identity;

if the vehicle direction is from the right to the left, CM' is set as True; timer is reset, and then its value is incremented gradually; the vehicle counter is incremented by one; and the vehicle identification module is activated;

when the vehicle passes the seventh sensor and the eighth sensor, the device identifies the direction of movement, the vehicle velocity, and the vehicle identity; if the direction of movement and the vehicle identity are the same as when the vehicle passes the fifth sensor and the sixth sensor, then the movement direction comparison module is activated; if the timer value exceeds the delay time, CM' value is set as False and then the movement direction comparison module is activated;

when the movement direction comparison module is activated, it checks the values of CM and CM'; if both CM and CM' are True, collision warning signals are emitted; if either CM or CM' is False, the collision warning signals are terminated.

BRIEF DESCRIPTION OF THE DRAWINGS

FIG. 10 illustrates the operating principle of the device according to the present invention.

DETAILED DESCRIPTION OF THE INVENTION

Figure 1:
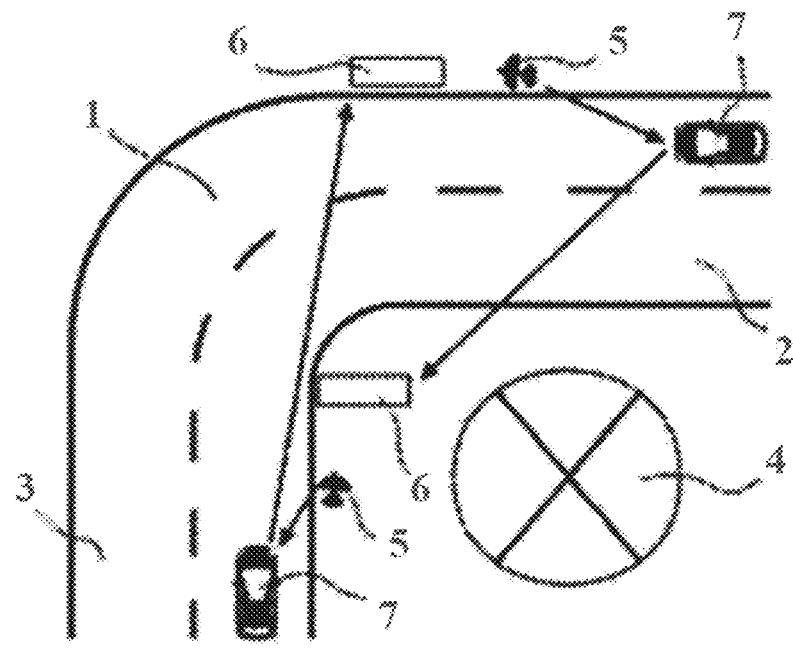
FIG. 1 illustrates the technical solution according to Chinese patent application publication No. CN108944767A.
Figure 2:
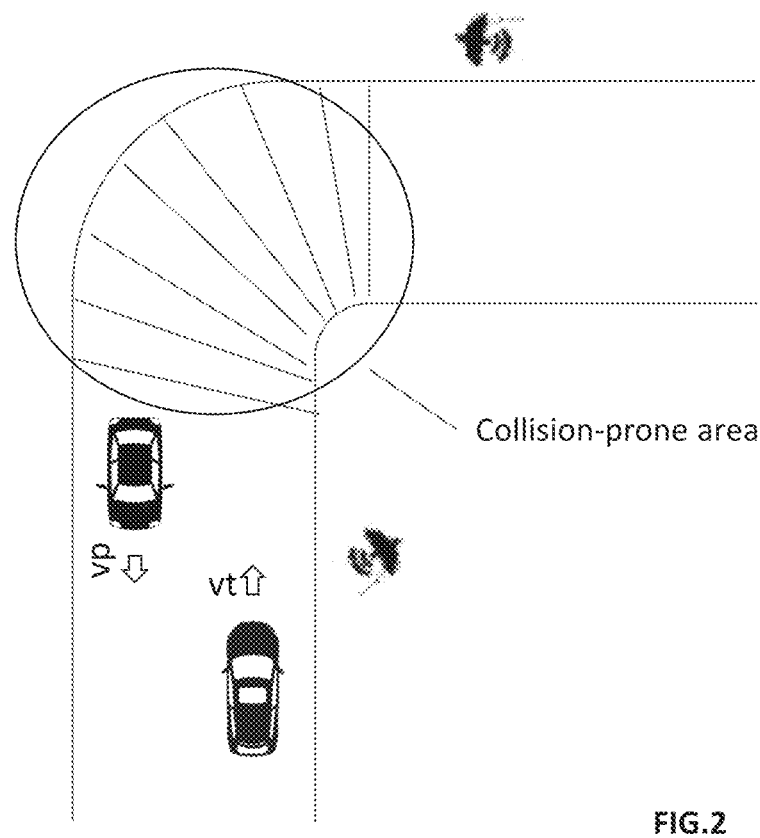
FIG. 2 illustrates a case where the technical solution according to Chinese patent application publication No. CN108944767A can erroneously emit warning signal.
Figure 3:
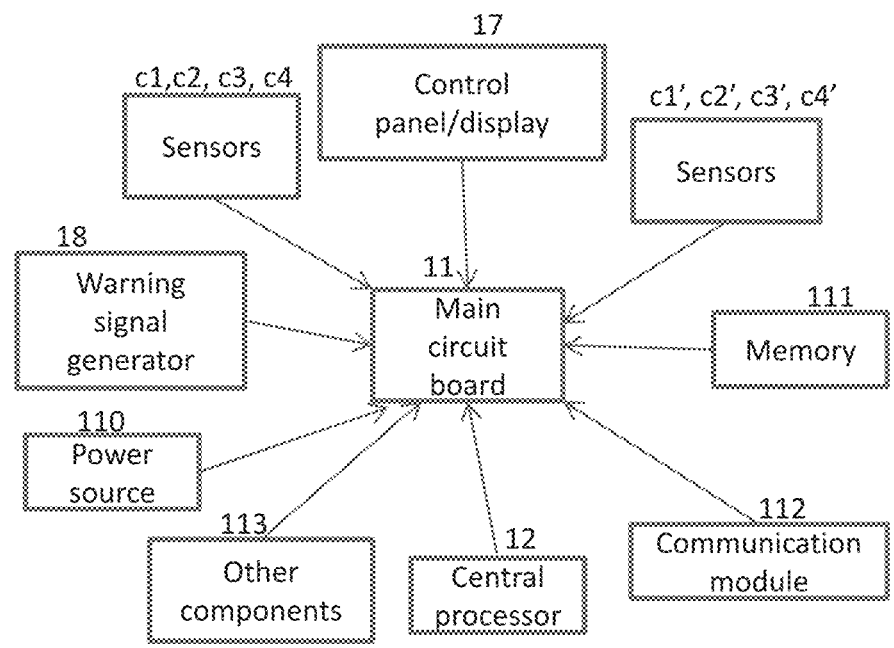
FIG. 3 is a diagram illustrates the traffic collision warning device according to an embodiment of the present invention.

As shown in FIG. 3, the traffic collision warning device according to an embodiment of the present invention comprises a main circuit board 11; a central processor 12; a control panel or a display 17; a warning signal generator 18; a power source 110; memory 111, a communication module 112, sensors c1, c2, c3, c4, c1', c2', c3', c4', and other components 113. In which, these components are directly or indirectly connected with the main board 11 and the whole device is generally controlled by the central processor 12. These components can certainly have their own processors or integrated circuits to enhance their performance. For example, the display can be equipped with a graphics card to increase image processing speed.

The warning signal generator 18 can be a loudspeaker, a light indicator, a monitor, or a combination thereof. Warning signals can be displayed on the monitor and/or the loudspeaker installed on the sides of the road. It is also possible that the warning signals are sent to electronics devices of the drivers or the vehicles.

Figure 8:
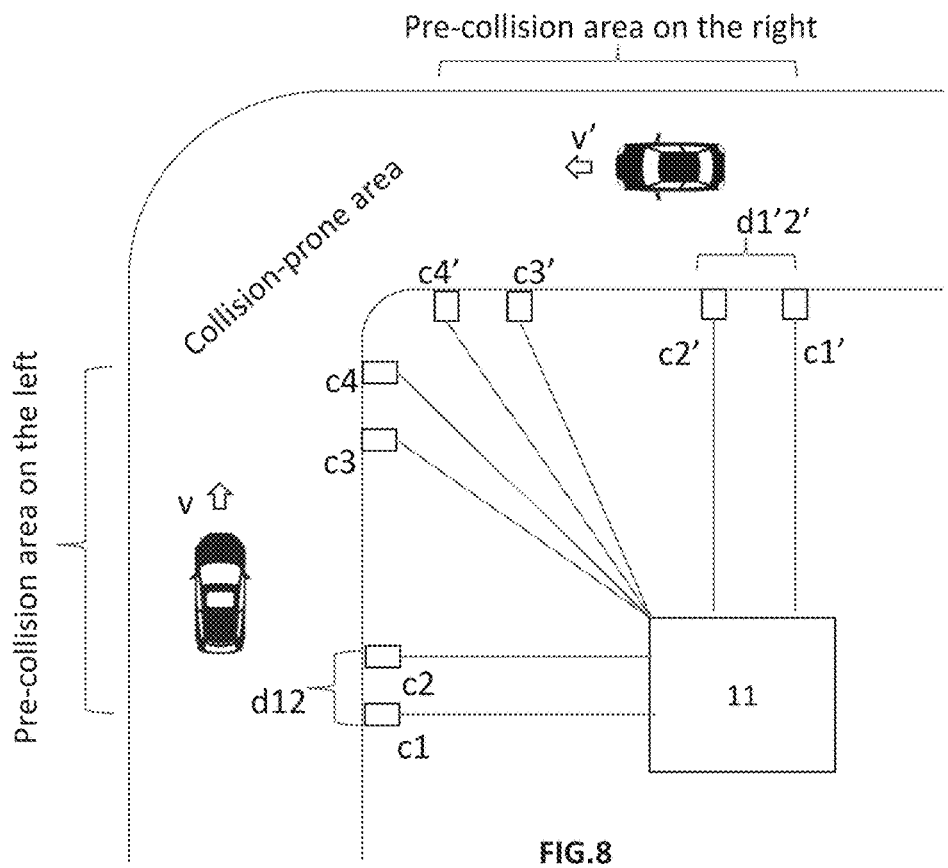
FIG. 8 and FIG. 9 illustrates the layout of the sensors of the device according to the present invention.

As shown in FIG. 8, the first sensor c1, the second sensor c2, the third sensor c3, and the fourth sensor c4 are arranged along the left side of collision-prone area; the fifth sensor c1', the sixth sensor c2', the seventh sensor c3', and the eighth sensor c4' are arranged along the right side of the collision-prone area. The pre-collision area on the left is the area from sensor c1 to sensor c4, the pre-collision area on the right is the area from sensor c1' to sensor c4'.

Figure 9:
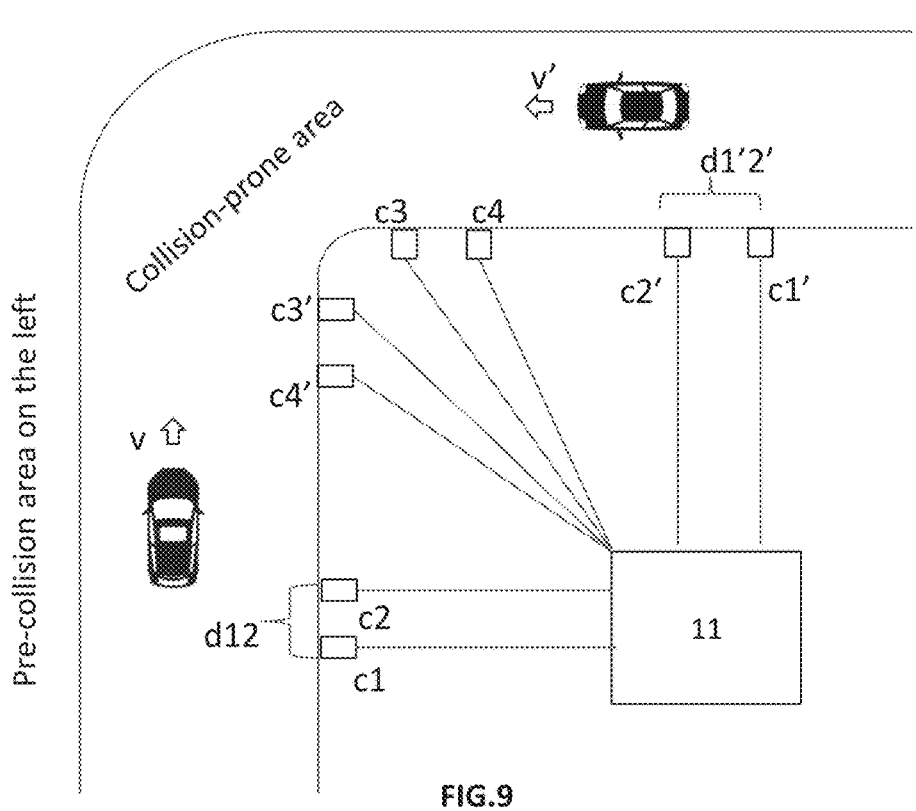

To adjust the pre-collision area, as shown in FIG. 9, sensors c3, c4, c3', c4' can be relocated closer to or further from the collision-prone area, or they can be relocated to the opposite side of the collision-prone area.

Figure 4:
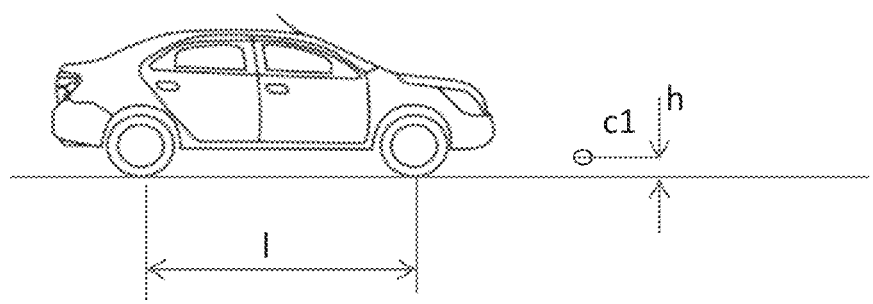
FIG. 4 illustrates the installation position of sensor c1 to measure the distance between the front wheels and the rear wheels of a vehicle.

FIG. 4 illustrates the installation position of sensor c1 to measure the distance between the front wheels and the rear wheels of a vehicle. The installation height h of sensor c1 in this case should be shorter than the ground clearance of the vehicle. As ground clearances of cars typically range from 15 to 25 cm, sensor c1 can be installed at a height of about 5 to 15 cm above the road surface.

Figure 5:
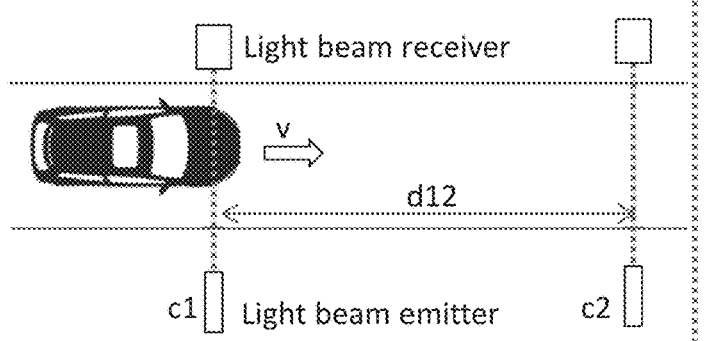
FIG. 5 illustrates a method to identify the direction of movement, the vehicle velocity and the distance between the wheels of a vehicle.
Figure 5:
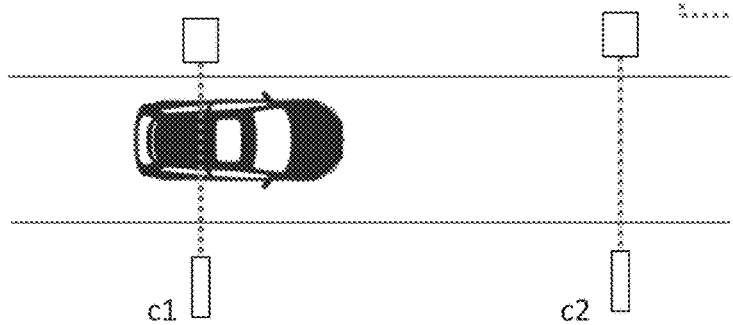
Figure 5:
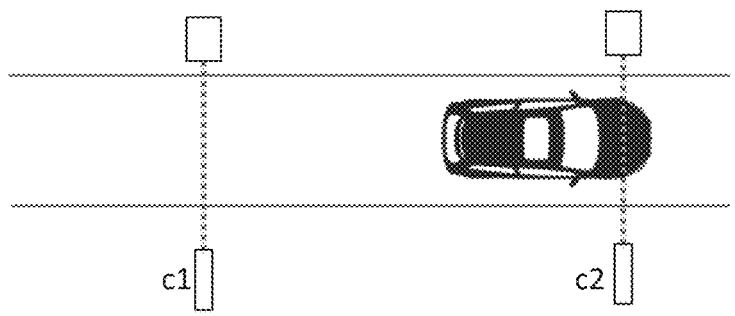
Figure 5:
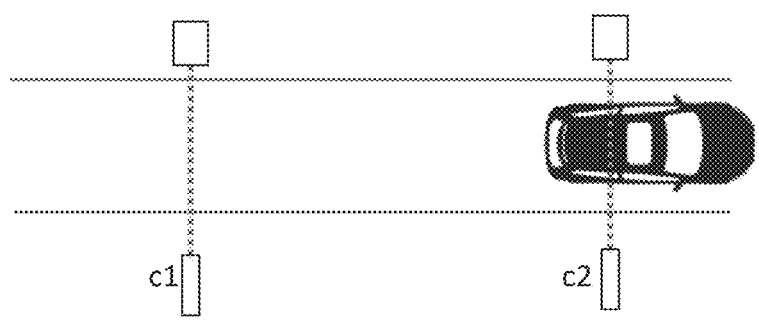

FIG. 5 illustrates a method to identify the direction of movement, the vehicle velocity and the distance between the front wheels and the rear wheels of a vehicle.

Wherein, d12 is the distance between sensor c1 and sensor c2, t1 is the time when the front wheels passes sensor c1, t2 is the time when the rear wheels passes sensor c1, t3 is the time when the front wheels pass sensor c2. It can be seen that:

$$t3-t1>0 \text{ indicates the movement of the vehicle from the left to the right} \quad (11)$$

$$t3-t1<0 \text{ indicates the movement of the vehicle from the right to the left} \quad (12)$$

In other words, if the vehicle passes through the sensor on the left first, the direction of movement of the vehicle is from the left to the right, if the vehicle passes through the sensor on the right first, the direction of movement of the vehicle is from the right to the left. The vehicle velocity is calculated by formula:

$$v=d12/|t3-t1| \quad (13)$$

In other words, the vehicle velocity is calculated by dividing the distance between the two sensors by the period of time it takes the front wheels to pass through the two sensors.

The distance between the front wheels and the rear wheels is calculated by formula:

$$l=v*|t2-t1| \quad (14)$$

In other words, the distance between the front wheels and the rear wheels is calculated by multiply the vehicle velocity and the period of time it takes both the front wheels and the rear wheels to pass the same sensor. In this case, the vehicle is identified by the distance between the front wheels and the rear wheels.

Figure 6:
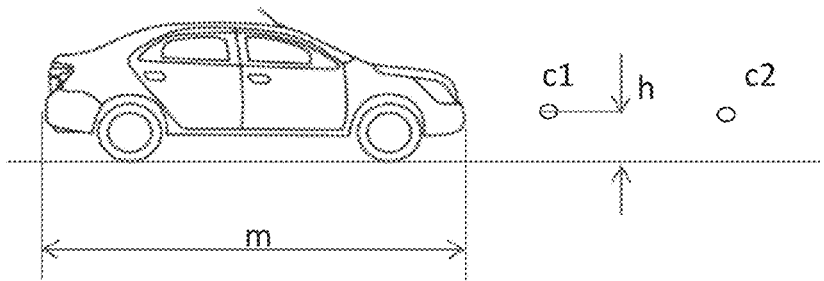
FIG. 6 illustrates the installation positions of sensors c1 and c2 to measure the length of a vehicle.
Figure 7:
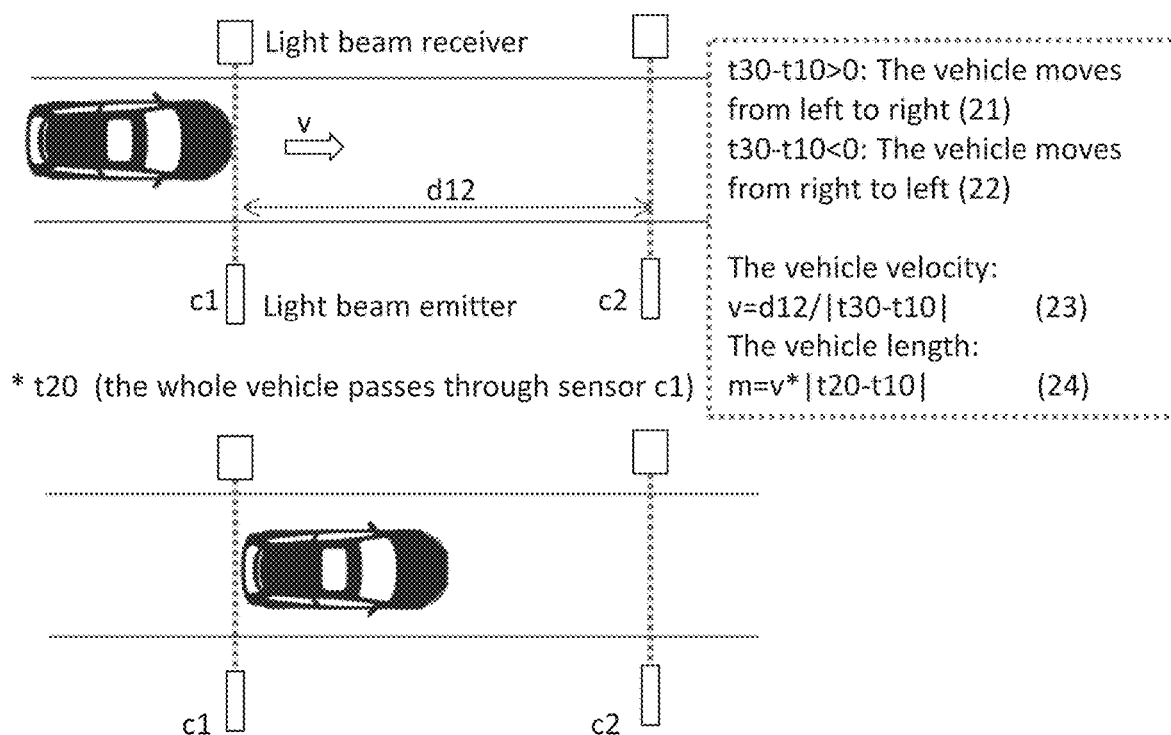
FIG. 7 illustrates a method of measuring the length of a vehicle.
Figure 7:
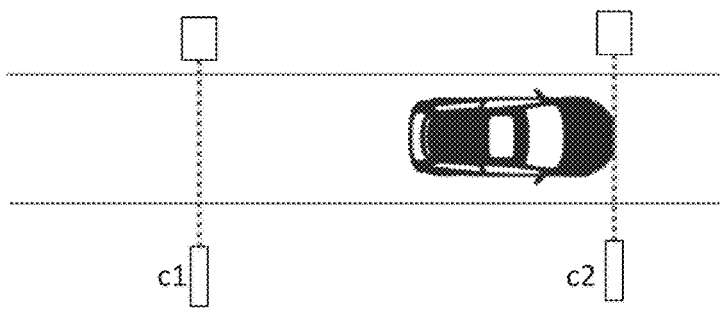

FIG. 6 and FIG. 7 show the installation positions of sensors c1 and c2 and the method of measuring the length of a vehicle. Wherein, t10 is the time when the front of the vehicle pass sensor c1, t20 is the time when the whole vehicle passes through sensor c1, t30 is the time when the front of the vehicle pass sensor c2. It can be seen that:

$$t30-t10>0: \text{ indicates the movement of the vehicle from the left to the right} \quad (21)$$

$$t30-t10<0: \text{ indicates the movement of the vehicle from the right to the left} \quad (22)$$

Vehicle velocity:

$$v=d12/|t30-t10| \quad (23)$$

Vehicle length:

$$m=v*|t20-t10| \quad (24)$$

Thus, the vehicle length is calculated by multiply the vehicle velocity and the period of time it takes the vehicle to pass through a sensor. In this case, the vehicle is identified by its length.

The vehicle can certainly be identified by other characteristics or by other methods, such as by image recognition.

The method to identify the direction of movement, the vehicle velocity, the distance between the front wheels and the rear wheels, and the length of the vehicle in different sensor pairs is similar to the above method, so it will not be described again in the following description.

FIG. 10 illustrates the operating principle of the device according to the present invention.

On the left side of the collision-prone area, firstly the device sets initial values for:

Vehicle counter: n;

Delay time to keep variable CM in True value: t0;

The value of delay time t0 can be estimated based on the time it takes for a vehicle to move from sensor c1 to c4.

When the vehicle passes through sensors c1, c2:

The direction of movement of the vehicle is identified according to formulas (11), (12) or (21), (22);

The vehicle velocity is calculated according to formula (13) or (23);

The vehicle identity is identified according to formula (14) or (24);

If the vehicle direction is from the left to the right: CM=True (this means the vehicle is moving to the collision-prone area from the left).

Timer tm is reset, and then its value is incremented gradually;

Vehicle counter n is incremented by one;

Vehicle identification module is activated;

If the direction of movement of the vehicle is from the right to the left, which means the vehicle is moving out of the pre-collision area, sensors c1, c2 are kept in waiting mode;

When the vehicle passes sensors c3, c4, the device identifies the direction of movement, the vehicle velocity, and the vehicle identity in the same way as when the vehicle passes sensors c1, c2;

If the direction of movement and the vehicle identity are the same as when the vehicle passes sensors c1, c2, but if the timer value exceeds the delay time (tm>t0), which means the vehicle has enough time to pass through the collision-prone area, collision warning is not necessary and CM value is set as False, and then the movement direction comparison module is activated.

On the right side of the collision-prone area, firstly the device sets initial values for:

Vehicle counter: n';

Delay time to keep variable CM' in True value: t0';

The value of delay time t0' can be estimated by the time it takes for a vehicle to move from sensor c1' to c4'.

When the vehicle passes through sensors c1', c2':

The direction of movement of the vehicle is identified according to the formulas (11), (12) or (21), (22);

The vehicle velocity is calculated according to formula (13) or (23);

The vehicle identity is identified according to formula (14) or (24);

If the vehicle direction is from the right to the left: CM'=True (this means the vehicle is moving to the collision-prone area from the right).

Timer tm' is reset, and then its value is incremented gradually;

Vehicle counter n' is incremented by one;

Vehicle identification module is activated;

If the direction of movement of the vehicle is from the left to the right, which means the vehicle is moving out of the pre-collision area, sensors c1', c2' are kept in waiting mode;

When the vehicle passes sensors c3', c4', the device identifies the direction of movement, the vehicle velocity, and the vehicle identity in the same way as when the vehicle passes sensors c1', c2';

If the direction of movement and the vehicle identity are the same as when the vehicle passes sensors c1', c2', and if the timer value exceeds the delay time (tm'>t0'), which means the vehicle has enough time to pass through the collision-prone area, collision warning is not necessary and CM' value is set as False, and then the movement direction comparison module is activated.

Upon activation, the movement direction comparison module checks the values of CM and CM'. If both CM and CM' are True, which means both vehicles are moving to collision-prone area and they are likely to meet each other in this area, then collision warning signals are emitted. If either CM or CM' is False, then collision warning signals are terminated.

In the case of multiple vehicles entering and exiting the pre-collision area consecutively within a short period of time, and if the True value of CM is not kept for a certain period of time t0, the warning signal will be continuously switched on and off which can lead to signal interference, false alarms, or discomfort to the drivers.

In addition, after a vehicle passes through two sensors c1, c2 into the pre-collision area, if another vehicle enters the pre-collision area, the timer tm is reset, and then its value is incremented gradually.

Assuming the distance from sensors c1 to c4 is 100 m, and the allowed velocity on the road is 10 m/s, then t0 can be set to 10 seconds. Of course, t0 can also be calculated according to other conditions such as road width, vehicle density, weather, etc.

Collision warning signals can be emitted at different levels depending on the velocities of the vehicles moving from opposite directions to the collision-prone area, for example:

+ if none of the vehicles exceed a safe velocity, the collision warning signal can be a low risk warning signal;

+ if one of the vehicles exceeds the safe velocity, the collision warning signal can be a risk warning signal;

+ if at least two vehicles exceed the safe velocity, the collision warning signal can be a high risk warning signal.

From the foregoing description, one skilled in the art can easily ascertain the essential characteristics of this invention, and without departing from the spirit and scope thereof, can make various changes and modifications the invention to adapt it to various usages and conditions. Consequently, such changes and modifications are properly, equitably, and intended to be, within the full range of equivalence of the following claims.

What is claimed is:

1. A traffic collision warning device comprising:
    a central processing unit configured for controlling operation of the device; and
    sensors comprising:
        a first sensor and a second sensor being arranged on the left side of a collision-prone area;
        a third sensor and a fourth sensor being arranged near the collision-prone area;
        a fifth sensor and a sixth sensor being arranged on the right side of the collision-prone area;
        a seventh sensor and an eighth sensor being arranged near the collision-prone area;
    the central processing unit being configured to:
        identify a direction of movement of vehicles based on the order in which each of the vehicles passes through the sensors;
        determine a vehicle velocity for each of the vehicles by dividing a distance between any two of the sensors by a period of time for the respective vehicle to pass through the any two of the sensors;
        identify a vehicle identity of each of the vehicles by multiplying the respective vehicle velocity and the period of time for the respective vehicle to pass through one of the sensors; and
        emit a collision warning signal in response to a determination that
            at least two of the vehicles are moving from opposite directions towards the collision-prone area at the same time based on the identified direction of movement and identified vehicle identity of each of the at least two of the vehicles, and
            at least one of the determined vehicle velocities of the at least two of the vehicles is greater than a predetermined safe velocity.

2. The device as claimed in claim 1, wherein the central processing unit is configured to emit collision warning signals at different levels depending on the determined velocities of the at least two of the vehicles.

* * * * *